United States Patent
Wang et al.

(10) Patent No.: US 8,676,053 B2
(45) Date of Patent: Mar. 18, 2014

(54) METHOD FOR MONITORING FIBER LINE STATE, REPEATER, SUBMARINE CABLE SYSTEM

(75) Inventors: Guozhong Wang, Beijing (CN); Dan Su, Beijing (CN); Bin Li, Beijing (CN); Guoyao Zhou, Beijing (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 156 days.

(21) Appl. No.: 13/330,097

(22) Filed: Dec. 19, 2011

(65) Prior Publication Data
US 2012/0106947 A1 May 3, 2012

Related U.S. Application Data

(63) Continuation of application No. PCT/CN2010/073784, filed on Jun. 11, 2010.

(30) Foreign Application Priority Data

Jun. 23, 2009 (CN) .......................... 2009 1 0108289

(51) Int. Cl.
*H04B 17/00* (2006.01)
(52) U.S. Cl.
USPC ................. 398/37; 398/11; 398/18; 398/33
(58) Field of Classification Search
USPC .............................................................. 398/9
See application file for complete search history.

(56) References Cited

U.S. PATENT DOCUMENTS

| 5,737,105 | A | 4/1998 | Ohta et al. |
| 5,926,263 | A | 7/1999 | Lynch et al. |
| 6,301,036 | B1 * | 10/2001 | Spencer .......................... 398/31 |
| 6,301,404 | B1 | 10/2001 | Yoneyama |
| 6,310,702 | B1 * | 10/2001 | Minami et al. .................. 398/13 |

(Continued)

FOREIGN PATENT DOCUMENTS

| CN | 1298238 A | 6/2001 |
| CN | 1394025 A | 1/2003 |

(Continued)

OTHER PUBLICATIONS

Written Opinion of the International Searching Authority in corresponding International Application No. PCT/CN2010/073784 (Sep. 23, 2010).

(Continued)

*Primary Examiner* — Ken Vanderpuye
*Assistant Examiner* — Amritbir Sandhu
(74) *Attorney, Agent, or Firm* — Leydig, Voit & Mayer, Ltd.

(57) ABSTRACT

The present invention relates to communications technologies, and discloses a method for monitoring the state of a fiber line, a repeater, and a submarine cable system. The repeater includes a first optical amplifier (OA), a second optical amplifier, a first gating unit, a second gating unit, a first coupler, a second coupler, a third coupler, and a fourth coupler. The first coupler, the fourth coupler, and the first gating unit form an in-to-in loopback path between the input end of the first OA and the input end of the second OA; and the second coupler, the third coupler, and the second gating unit form an out-to-out loopback path between the output end of the first OA and the output end of the second OA.

9 Claims, 5 Drawing Sheets

(56) References Cited

U.S. PATENT DOCUMENTS

| | | | | |
|---|---|---|---|---|
| 6,317,535 | B1* | 11/2001 | Jennings et al. | 385/24 |
| 7,388,657 | B2* | 6/2008 | Abbott | 356/73.1 |
| 8,009,983 | B2* | 8/2011 | Zhang | 398/37 |
| 8,135,274 | B2* | 3/2012 | Zhang et al. | 398/11 |
| 8,290,361 | B2* | 10/2012 | Nakano | 398/9 |
| 8,483,559 | B2* | 7/2013 | Zhang et al. | 398/9 |
| 2002/0063921 | A1* | 5/2002 | Terahara et al. | 359/124 |
| 2003/0011855 | A1* | 1/2003 | Fujiwara | 359/177 |
| 2004/0047629 | A1* | 3/2004 | Evangelides et al. | 398/33 |
| 2005/0002386 | A1 | 1/2005 | Shiragaki | |
| 2010/0290786 | A1* | 11/2010 | Abbott | 398/79 |
| 2012/0106947 | A1* | 5/2012 | Wang et al. | 398/9 |
| 2012/0121258 | A1* | 5/2012 | Li et al. | 398/37 |
| 2012/0128353 | A1* | 5/2012 | Li | 398/45 |
| 2012/0177362 | A1* | 7/2012 | Zhang et al. | 398/9 |

FOREIGN PATENT DOCUMENTS

| | | |
|---|---|---|
| CN | 1520068 A | 8/2004 |
| CN | 201025711 Y | 2/2008 |
| EP | 0981215 A2 | 2/2000 |
| EP | 1215836 A2 | 6/2002 |
| EP | 1241805 A2 | 9/2002 |
| GB | 2294374 A | 4/1996 |

OTHER PUBLICATIONS

Guo, "Accurate location of fiber cable troubles by using Optical Time Domain Reflectormeter and error analysis," Aug. 2003, vol. 2, No. 3, China Academic Journal Electronic Publishing House.

"Fiber Test and Analysis Based on OTDR," Feb. 2008, vol. 27, No. 1, China Academic Journal Electronic Publishing House.

Extended European Search Report in corresponding European Patent Application No. 10791466.5 (Nov. 15, 2012).

International Search Report in corresponding PCT Application No. PCT/CN2010/073784 (Sep. 23, 2010).

* cited by examiner

Gate a first probe light transmitted by the uplink fiber of a previous span and couple this first probe light to a downlink fiber line of a next span; and couple the first probe light scattered and/or reflected in the downlink fiber of the next span to a downlink fiber of the previous span so that the monitoring device monitors the state of the downlink fiber of the next span according to the scattered and/or reflected first probe light that is returned along the downlink fiber /S1

Couple a second probe light transmitted by the uplink fiber of the previous span to an uplink fiber of the next span; and gate the second probe light scattered and/or reflected in the uplink fiber of the next span and couple this second probe light to the downlink fiber of the previous span so that the monitoring device monitors the state of the uplink fiber of the next span according to the scattered and/or reflected second probe light that is returned along the downlink fiber /S2

METHOD FOR MONITORING FIBER LINE STATE, REPEATER, SUBMARINE CABLE SYSTEM

CROSS-REFERENCE TO RELATED APPLICATIONS

This application is a continuation of International Application No. PCT/CN2010/073784, filed on Jun. 11, 2010, which claims priority to Chinese Patent Application No. 200910108289.8, filed on Jun. 23, 2009, both of which are hereby incorporated by reference in their entireties.

FIELD OF THE INVENTION

The present invention relates to communications technologies, and in particular, to a method for monitoring the state of a fiber line, a repeater, and a submarine cable system.

BACKGROUND OF THE INVENTION

In recent years, a submarine cable service has been developed rapidly. But sometimes, due to a special location, a submarine cable is hard to maintain and manage directly. However, the submarine cable plays an important role in a transport network, which requires that an equipment vendor provides a corresponding product for monitoring a submarine equipment. A monitoring device needs to monitor an entire submarine cable system without affecting the submarine fiber service, provide information required by a maintenance engineer, and perform trouble location, monitoring, and management, which helps to maintain the submarine cable system.

Currently, a submarine cable system is constructed by a form of distributing fiber pairs. To facilitate locating of a submarine cable fault, fiber pairs are connected by a form of coupling. Probe light undergoes Rayleigh scattering and/or Fresnel reflection in the fiber. A part of scattered light and/or reflected light is returned to a probe device through a loopback path. The state of the submarine cable line is monitored by analyzing the scattered light and/or reflected light.

Figure 1:
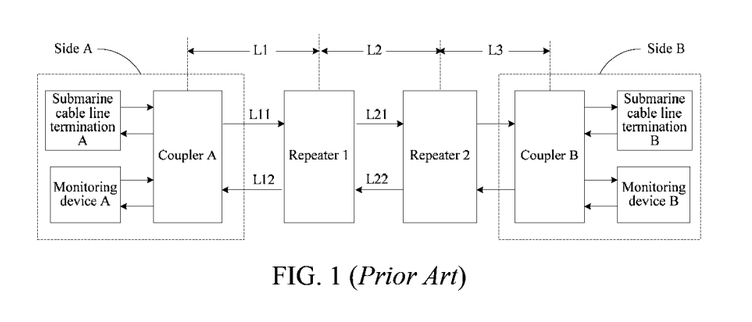
FIG. 1 is a schematic structural diagram of a submarine cable system in the prior art.

FIG. 1 is a simplified block diagram of a submarine cable system. The submarine cable line termination A is located on one end (end A) of the submarine cable system, and submarine cable line termination B is located on the other end (end B) of the submarine cable system. Termination A and termination B are connected through submarine cables (such as L1, L2, and L3) to transmit the submarine cable service. A repeater is used to amplify optical signals transmitted on the fiber in the submarine cable. Fiber L11 and fiber L12 are a fiber pair in submarine cable L1. Using terminal A as a reference point, a signal sent from end A to end B is an uplink signal, and a signal received on end A from end B is a downlink signal. The fiber that bears the uplink signal is an uplink fiber, such as L11 and L21 in FIG. 1; and the fiber that bears the downlink signal is a downlink fiber, such as L12 and L22 in FIG. 1. FIG. 1 is only a visualized description of a submarine cable system. In a practical submarine cable system, the distance between end A and end B is generally hundreds or even thousands of kilometers, the number of repeaters between end A and end B is far more than two. Monitoring unit A and monitoring device B are configured to monitor fiber lines in the submarine cable. A probe light sent by the monitoring unit A combines with a service light sent by the submarine cable line termination A, and is transmitted to a peer end after passing through the submarine optical cables and the submarine repeater. The submarine cable fiber pair is looped back and coupled inside the repeater so that the probe light generated by the monitoring unit A may return to the monitoring unit A through the loopback path in the repeater. In this way, a probe signal is received and analyzed, and the submarine cable system is monitored.

Figure 2:
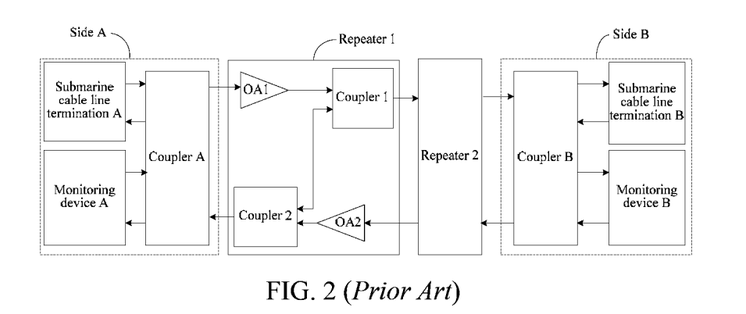
FIG. 2 is a schematic structural diagram of a repeater in the prior art.

In the conventional art, an out-to-out loopback mode is applied to monitor the state of the submarine line, as shown in FIG. 2. The out-to-out loopback mode means that in the repeater, the output end of an optical amplifier (OA) 1 is connected with a coupler 1, and the output end of an OA 2 is connected with a coupler 2; the coupler 1 is connected with the coupler 2 through a fiber, and the path formed by the fiber, the coupler 1, and the coupler 2 is called an out-to-out loopback path. In this loopback mode, the method for monitoring the submarine cable line is: The monitoring device A sends probe light 1, the probe light 1 passes through the OA1 and the coupler 1 in the uplink fiber, and continues to be transmitted in the uplink fiber of the submarine cable between the repeater 1 and the repeater 2; in this uplink fiber, the probe light 1 undergoes Rayleigh scattering and/or Fresnel reflection, and therefore, a part of the probe light 1 is transmitted reversely in the uplink fiber, and this part of light is transmitted to the coupler 1 and coupled to the output end of the OA2 of the downlink fiber along the out-to-out loopback path, and finally, returned to the monitoring device A along the downlink fiber. By detecting the probe light scattered and/or reflected, the monitoring device A analyzes and monitors the state of the uplink fiber and locates the fault of the uplink fiber. The method for locating the fault of the downlink fiber is the same as the method for locating the fault of the uplink fiber except that the monitoring device B on the peer end sends probe light 2 and that the scattered and/or reflected probe light of the monitoring device B are transmitted back through the uplink fiber and are finally received and detected.

In the research process, the inventor of the present invention finds that the out-to-out loopback mode in the conventional art for monitoring the submarine cable line has at least the following two problems: a monitoring device on one end of the submarine cable system is capable of monitoring the state of one fiber only (an uplink fiber or a downlink fiber), and is unable to monitor both the state of the uplink fiber and the state of the downlink fiber.

SUMMARY OF THE INVENTION

An embodiment of the present invention provides a method for monitoring a state of a fiber line, including:
  gating a first probe light transmitted by an uplink fiber of a previous span and coupling this first probe light to a downlink fiber of a next span; amplifying the first probe light scattered and/or reflected in the downlink fiber of the next span, and coupling the amplified first probe light to the downlink fiber of the previous span so that a monitoring device monitors the state of the downlink fiber of the next span according to the scattered and/or reflected first probe light that is returned along the downlink fiber; and
  amplifying a second probe light transmitted by the uplink fiber of the previous span, and coupling the amplified second probe light to the uplink fiber of the next span; gating the first probe light scattered and/or reflected in the uplink fiber of the next span and coupling this first probe light to the downlink fiber of the previous span so that the monitoring device monitors the state of the uplink fiber of the next span according to the scattered and/or reflected second probe light that is returned along the downlink fiber.

An embodiment of the present invention provides a repeater, including: a first OA, a second OA, a first gating unit, a second gating unit, a first coupler, a second coupler, a third coupler, and a fourth coupler.

The first OA is configured to amplify optical signals transmitted by an uplink fiber; a second OA is configured to amplify optical signals transmitted by a downlink fiber;

The first gating unit is configured to gate a first probe light, where a first end of the first gating unit is connected with a first output end of the first coupler, an input end of the first OA is connected with a second output end of the first coupler, an input end of the first coupler is connected with the uplink fiber of a previous span, a second end of the first gating unit is connected with a first output end of the fourth coupler, an input end of the second OA is connected with a second output end of the fourth coupler, and an input end of the fourth coupler is connected with the downlink fiber of a next span;

The second gating unit is configured to gate a second probe light, where a first end of the second gating unit is connected with a first input end of the second coupler, an output end of the first OA is connected with a second input end of the second coupler, an output end of the second coupler is connected with the uplink fiber of the next span, a second end of the second gating unit is connected with a first input end of the third coupler, an output end of the second OA is connected with a second input end of the third coupler, and an output end of the third coupler is connected with the downlink fiber of the previous span.

Another embodiment of the present invention provides a submarine cable system that includes multiple repeaters, in which the multiple repeaters are connected with each other through a submarine cable, where:

the repeaters are configured to: gate a first probe light transmitted by an uplink fiber of a previous span of the submarine cable and couple this first probe light to a downlink fiber of a next span of the submarine cable; and are further configured to amplify the first probe light scattered and/or reflected in the downlink fiber of the next span, and couple the amplified first probe light to a downlink fiber of the previous span of the submarine cable; and the repeaters are further configured to: amplify a second probe light transmitted by the uplink fiber of the previous span of the submarine cable, and couple the amplified second probe light to the uplink fiber of the next span of the submarine cable; and gate the second probe light scattered and/or reflected in the uplink fiber of the next span of the submarine cable, and couple the scattered and/or reflected second probe light to the downlink fiber of the previous span of the submarine cable.

In the embodiments of the present invention, the repeaters gate the first probe light transmitted by the uplink fiber of the previous span and couple this first probe light to the downlink fiber of the next span, and gate the second probe light scattered and/or reflected in the uplink fiber of the next span and couple this second probe light to the downlink fiber of the previous span; and therefore, when receiving the first probe light, the monitoring device may determine that the first probe light is the first probe light scattered and/or reflected in the downlink fiber, and when receiving the second probe light, may determine that the second probe light is the second probe light scattered and/or reflected in the uplink fiber. In this way, the monitoring device monitors the state of the downlink fiber of the submarine cable according to a received first probe light, and monitors the state of the uplink fiber according to a received second probe light, and therefore, the monitoring device may monitor both the state of the uplink fiber and the state of the downlink fiber of the submarine cable on a single end of the submarine cable system.

BRIEF DESCRIPTION OF THE DRAWINGS

To make the technical solution of the present invention or the prior art clearer, the following briefly introduces the accompanying drawings involved in the description of the embodiments of the present invention or the prior art. Apparently, the accompanying drawings described below are illustrative rather than exhaustive, and persons skilled in the art may derive other drawings from them without creative efforts.

DETAILED DESCRIPTION OF THE EMBODIMENTS

The following detailed description is given with reference to the accompanying drawings to provide a clear understanding of the technical solution of the present invention. Evidently, the embodiments to be described are merely a part of rather than all of the embodiments of the present invention. All other embodiments, which may be derived by those skilled in the art from the embodiments given herein without creative efforts, shall fall within the protection scope of the present invention.

The technical solution of the present invention is described below with reference to accompanying drawings and exemplary embodiments.

Figure 3:
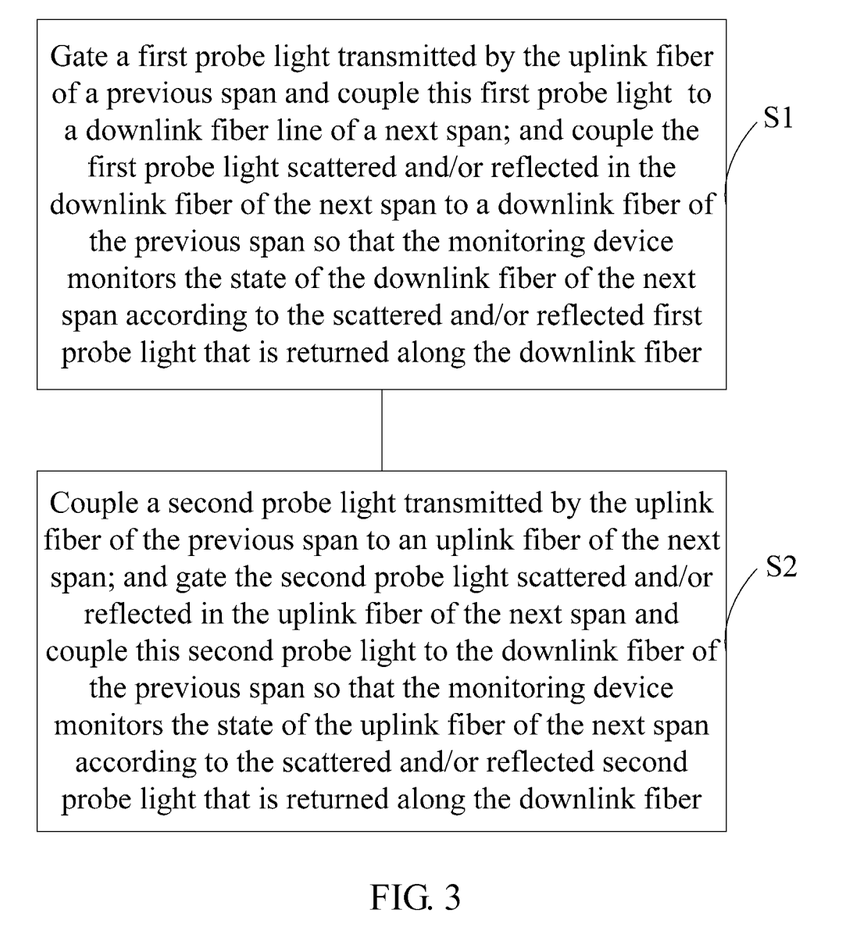
FIG. 3 is a schematic flowchart of a method for monitoring a state of a submarine cable line according to an embodiment of the present invention.

In the submarine cable system shown in FIG. 1, a submarine cable and a repeater are laid underwater, and it is important to monitor the state of a fiber line in the submarine cable. An embodiment of the present invention provides a method for monitoring the state of a submarine cable line, and therefore, the monitoring device on either end of the submarine cable system may monitor both the state of an uplink fiber line in the submarine cable and the state of a downlink fiber line in the submarine cable. FIG. 3 is a schematic flowchart of this method.

S1: Gate a first probe light transmitted by an uplink fiber of a previous span and couple this first probe light to a downlink fiber line of a next span; and couple the first probe light scattered and/or reflected in the downlink fiber of the next span to a downlink fiber of the previous span so that the monitoring device monitors the state of the downlink fiber of the next span according to the scattered and/or reflected first probe light that is returned along the downlink fiber.

In this step, the first probe light is sent by the monitoring device on either end of the submarine cable system. For example, in the submarine cable system shown in FIG. 1, the monitoring device A on end A sends the first probe light, and the first probe light is coupled by the coupler A into the uplink fiber L11 of the L1 span of the submarine cable. The first probe light is transmitted by the uplink fiber L11 to the repeater 1, gated by the repeater 1 and coupled by the repeater 1 to the downlink fiber L22 of the L2 span of the submarine cable, and then transmitted towards the direction of the repeater 2. In the process of being transmitted to the repeater 2 in the downlink fiber L22, the first probe light undergoes Rayleigh scattering and/or Fresnel reflection. Therefore, a part of the first probe light is returned to the repeater 1, and the repeater 1 amplifies the returned part of the first probe light, and couples the returned part of the first probe light to the downlink fiber L12 of the L1 span of the submarine cable. The coupler A separates the first probe light from optical signals in the downlink fiber L12, and sends the first probe light to the monitoring device A. The monitoring device A analyzes and monitors the state of the downlink fiber line L22 in the L2 span of the submarine cable according to the first probe light. Specifically, the monitoring device A monitors the state of the downlink fiber L22 (for example, whether the downlink fiber line L22 is cut off) by detecting the optical power of the scattered and/or reflected first probe light.

The Rayleigh scattering is caused by the defect of a fiber itself or the unevenness of a dopant component, and may occur on each point of the fiber line. The Fresnel reflection occurs at the border of two transmission media that have different refractive indexes, for example, occurs at a connector, a mechanical joint, a fiber cut, or a fiber termination.

S2: Couple a second probe light transmitted by the uplink fiber of the previous span to an uplink fiber of the next span; and gate the second probe light scattered and/or reflected in the uplink fiber of the next span and couple this second probe light to the downlink fiber of the previous span so that the monitoring device monitors the state of the uplink fiber of the next span according to the scattered and/or reflected second probe light that is returned along the downlink fiber.

The submarine cable system in FIG. 1 is still taken as an example to describe this step. The monitoring device A on end A sends the second probe light, and the coupler A couples the second probe light to the uplink fiber L11 of the L1 span of the submarine cable. The second probe light is transmitted to the repeater 1. The repeater 1 amplifies the second probe light and couples it to the uplink fiber L21 of the L2 span of the submarine cable. In the process of being transmitted to the repeater 2 in the uplink fiber L21, the second probe light undergoes Rayleigh scattering and/or Fresnel reflection. Therefore, a part of the second probe light is returned to the repeater 1. The repeater 1 couples the scattered and/or reflected second probe light to the downlink fiber L12 of the L1 span of the submarine cable. The scattered and/or reflected second probe light is transmitted back to end A of the submarine cable system along the downlink fiber L12. The coupler on end A separates the scattered and/or reflected second probe light from the optical signals transmitted in the downlink fiber of the L1 span, and transmits the second probe light to the monitoring device A. The monitoring device A analyzes and monitors the state of the uplink fiber L21 in the L2 span of the submarine cable according to the second probe light.

The method for monitoring the state of the uplink fiber and the downlink fiber of the L2 span is also applicable to monitoring the state of the uplink fiber and the downlink fiber of other spans.

The wavelength of the first probe light is different from that of the second probe light. It should be noted that FIG. 1 shows the submarine cable system in the prior art, in which the repeaters (as illustrated by FIG. 2) are based on the prior art and are unable to implement the foregoing operations. In this embodiment of the present invention, the repeaters of the submarine cable system shown in FIG. 1 are cited for the purpose of describing the method for monitoring the state of the submarine cable line according to the present invention.

The steps above are not sequence-sensitive, and step S1 and step S2 may occur simultaneously as long as the monitoring device on either end (such as end A) in the submarine cable system sends the first probe light and the second probe light simultaneously.

In this embodiment of the present invention, the repeater gates only the first probe light transmitted by the uplink fiber of the previous span and couples only this first probe light to the downlink fiber of the next span, and gates only the second probe light scattered and/or reflected in the uplink fiber of the next span and couples this second probe light to the downlink fiber of the previous span; and therefore, the monitoring device A may determine that a received probe light is scattered and/or reflected in the downlink fiber as long as the received probe light is the first probe light, and may determine that the received probe light is scattered and/or reflected in the uplink fiber as long as the received probe light is the second probe light. In this way, the monitoring device A may monitor the state of the downlink fiber of the submarine cable according to a received first probe light, and monitor the state of the uplink fiber according to a received second probe light, and therefore, the monitoring device may monitor both the state of the uplink fiber and the state of the downlink fiber of the submarine cable on a single end of the submarine cable system.

Figure 4:
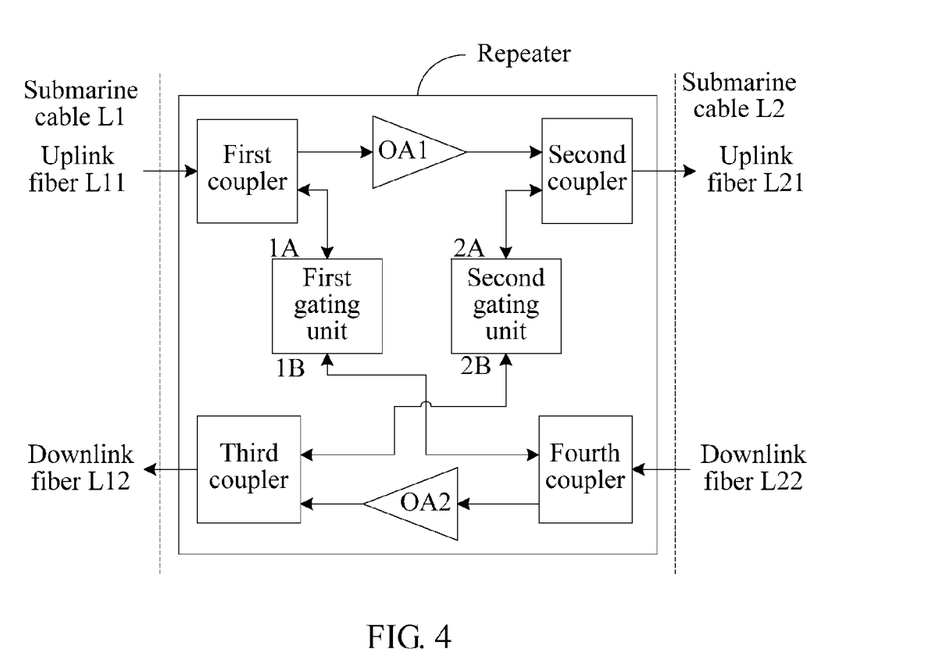
FIG. 4 is a schematic structural diagram of a repeater according to an embodiment of the present invention.

An embodiment of the present invention provides a repeater. As shown in FIG. 4, the repeater includes OA1, OA2, a first gating unit, a second gating unit, a first coupler, a second coupler, a third coupler, and a fourth coupler. The first gating unit is configured to gate the first probe light, and the second gating unit is configured to gate the second probe light. OA1 is configured to amplify optical signals transmitted in the uplink fiber, and OA2 is configured to amplify optical signals transmitted in the downlink fiber.

One end (1A) of the first gating unit and an input end of OA1 are connected with one end of the first coupler, the other end of the first coupler is connected with the uplink fiber (such as L11) of the previous span, the other end (1B) of the first gating unit and the input end of OA2 are connected with the fourth coupler, and the other end of the fourth coupler is connected with the downlink fiber (such as L22) of the next span. A path formed by "the first coupler—the first gating unit—the third coupler" is called an in-to-in loopback path.

One end (2A) of the second gating unit and an output end of OA1 are connected with one end of the second coupler, the other end of the second coupler is connected with the uplink fiber (such as L21) of the next span, the other end (2B) of the second gating unit and the output end of OA2 are connected with the third coupler, and the other end of the third coupler is connected with the downlink fiber (such as L12) of the previous span. A path formed by "the second coupler—the second gating unit—the third coupler" is called an out-to-out loopback path.

In a submarine cable system equipped with the repeaters shown in FIG. 4, a monitoring device may monitor both the state of the uplink fiber and the state of the downlink fiber of the submarine cable on a single end of the submarine cable system. The following describes a working process of a repeater at the time of monitoring the state of the uplink fiber and the state of the downlink fiber.

The monitoring device (such as monitoring device A on end A shown in FIG. 1) on a end of the submarine cable system sends a first probe light to monitor the state of the downlink fiber of the submarine cable. The first probe light and a service light that is transmitted by submarine cable line termination A are coupled by the coupler A to the uplink fiber. It should be noted that the first probe light and the service light may also be coupled by a multiplexer-demultiplexer to the uplink fiber. The service light is optical signals that bear a service, and the wavelength of the service light is different from that of the first probe light. The service light and the first probe light are transmitted by the uplink fiber (such as uplink fiber L11) to the repeater shown in FIG. 4. The processing of the service light in the repeater is similar to the processing of the first probe light in the repeater. Therefore, the processing of the first probe light in the repeater is detailed below.

The first coupler divides the first probe light transmitted by the uplink fiber L11 into two parts. One part is amplified by OA1 and coupled by the second coupler to the uplink fiber L21 in the next span L2 of the submarine cable; and the other part is coupled through the in-to-in loopback path that includes the first gating unit to the downlink fiber L22 in the next span L2 of the submarine cable, and the transmission direction of this part of the first probe light in the downlink fiber L22 is opposite to the transmission direction of a service light in the downlink fiber L22.

The first probe light transmitted in the downlink fiber L22 undergoes Rayleigh scattering and/or Fresnel reflection in the downlink fiber L22, and therefore, a part of the first probe light is returned to the repeater shown in FIG. 4, and the fourth coupler in the repeater divides a scattered and/or reflected part of the first probe light into two parts. One part is amplified by OA2 and then coupled by the third coupler to the downlink fiber L12 in the previous span L1 of the submarine cable, and finally returned to the monitoring device A on end A; and the other part is coupled through the in-to-in loopback path to the uplink fiber L11 in the previous span L1 of the submarine cable, and transmitted to a previous repeater along a direction opposite to the transmission direction of the service light in the uplink fiber L11. In the previous repeater, the reversely transmitted scattered and/or reflected part of the first probe light is blocked.

The first probe light transmitted in the uplink fiber L21 also undergoes Rayleigh scattering and/or Fresnel reflection, and therefore, a part of the first probe light is returned to the repeater shown in FIG. 4, and the second coupler divides the scattered and/or reflected portion of the first probe light into two parts. One part is blocked by the second gating unit in the out-to-out loopback path because the second gating unit selects only the second probe light; and the other part is blocked by OA1 because an optical isolator is integrated in every OA to isolate transmission of a reverse light. Therefore, the part of the first probe light, which is scattered and/or reflected in the uplink fiber L21, is not able to return to the monitoring device A on end A.

Only the part of the first probe light, which is scattered and/or reflected in the downlink fiber L22, may return to the monitoring device A on end A. The monitoring device A on end A may determine the first probe light as the first probe light scattered and/or reflected in the downlink fiber when receiving the first probe light transmitted back along the downlink fiber, and may analyze the first probe light to know the state of the downlink fiber.

When monitoring the state of the uplink fiber in the submarine cable, the monitoring device A on end A sends the second probe light. The second probe light is transmitted by the uplink fiber L11 to the repeater shown in FIG. 4. The first coupler in the repeater divides the second probe light into two parts. One part is amplified by OA1 and coupled by the second coupler to the uplink fiber L21 in the next span L2 of the submarine cable; and the other part is blocked by the first gating unit when passing through the in-to-in loopback path because the first gating unit selects only the first probe light rather than the second probe light.

The second probe light transmitted in the uplink fiber L21 undergoes Rayleigh scattering and/or Fresnel reflection in the uplink fiber, and therefore, a part of the second probe light is returned to the repeater shown in FIG. 4, and the second coupler divides the scattered and/or reflected part of the second probe light into two parts. One part is coupled through the out-to-out loopback path to the downlink fiber in the previous span L1 of the submarine cable, and finally returned to the monitoring device A on end A; and the other part is blocked by OA1. Therefore, the second probe light finally transmitted back to end A along the downlink fiber is the second probe light scattered and/or reflected in the uplink fiber L21; and the monitoring device A may determine the second probe light as the second probe light scattered and/or reflected in the uplink fiber when receiving the second probe light transmitted back along the downlink fiber, and may analyze the second probe light to know the state of the uplink fiber.

It should be noted that the wavelength of the first probe light is different from that of the second probe light, and wavelength of the first probe light and wavelength of the second probe light are also different from wavelength of the service light.

The first gating unit and the second gating unit in this embodiment may be filters. For example, the first gating unit is a band-pass filter, and the second gating unit is a band-stop filter. At the time of designing the band-pass filter and the band-stop filter, a passband range of the band-pass filter may coincide with a stopband range of the band-stop filter, and frequency of the first probe light falls within the passband range of the band-pass filter, but frequency of the second probe light falls outside the stopband range of the band-stop filter. For example, the frequency of the first probe light is 193.435 THz, and the frequency of the second probe light is 193.485 THz; the stopband range of the band-stop filter may be set to 193.425 THz-193.475 THz, and the passband range of the band-pass filter may be set to 193.425 THz-193.475 THz. Nevertheless, at the time of designing the band-pass filter and the band-stop filter, it is also appropriate if the passband range of the band-pass filter does not coincide with the stopband range of the band-stop filter completely, or even does not coincide with the stopband range of the band-stop filter at all. For example, the passband range of the band-pass filter is set to 193.430 THz-193.480 THz, and the stopband range of the band-stop filter is set to 193.415 THz-193.465 THz.

This embodiment does not restrict which filter is used as the first gating unit or the second gating unit. The filters meet the requirements if the filter serving as the first gating unit lets pass the first probe light and blocks the second probe light, while the filter serving as the second gating unit lets pass of the second probe light and blocks the first probe light. Therefore, the following combinations are also appropriate: (1) The first gating unit is a band-stop filter, and the second gating unit is a band-pass filter; or (2) the first gating unit is a band-pass filter, and the second gating unit is a band-pass filter; or (3) the first gating unit is a band-stop filter, and the second gating unit is a band-stop filter.

After an amplifier of such a structure is applied, the monitoring device on either end of the submarine cable system may monitor both the state of the uplink fiber and the state of the downlink fiber of the submarine cable. If the repeaters in the submarine cable system shown in FIG. 1 apply the structure described in this embodiment, the monitoring device A on end A sends the first probe light, and analyzes and monitors the state of the downlink fiber in the submarine cable according to the received first probe light that is transmitted back from the downlink fiber. The monitoring device A also sends the second probe light, and analyzes and monitors the state of the uplink fiber in the submarine cable according to the received second probe light that is transmitted back from the downlink fiber. Therefore, the monitoring device may monitor both the state of the uplink fiber and the state of the downlink fiber of the submarine cable on a single end of the submarine cable system.

Figure 5:
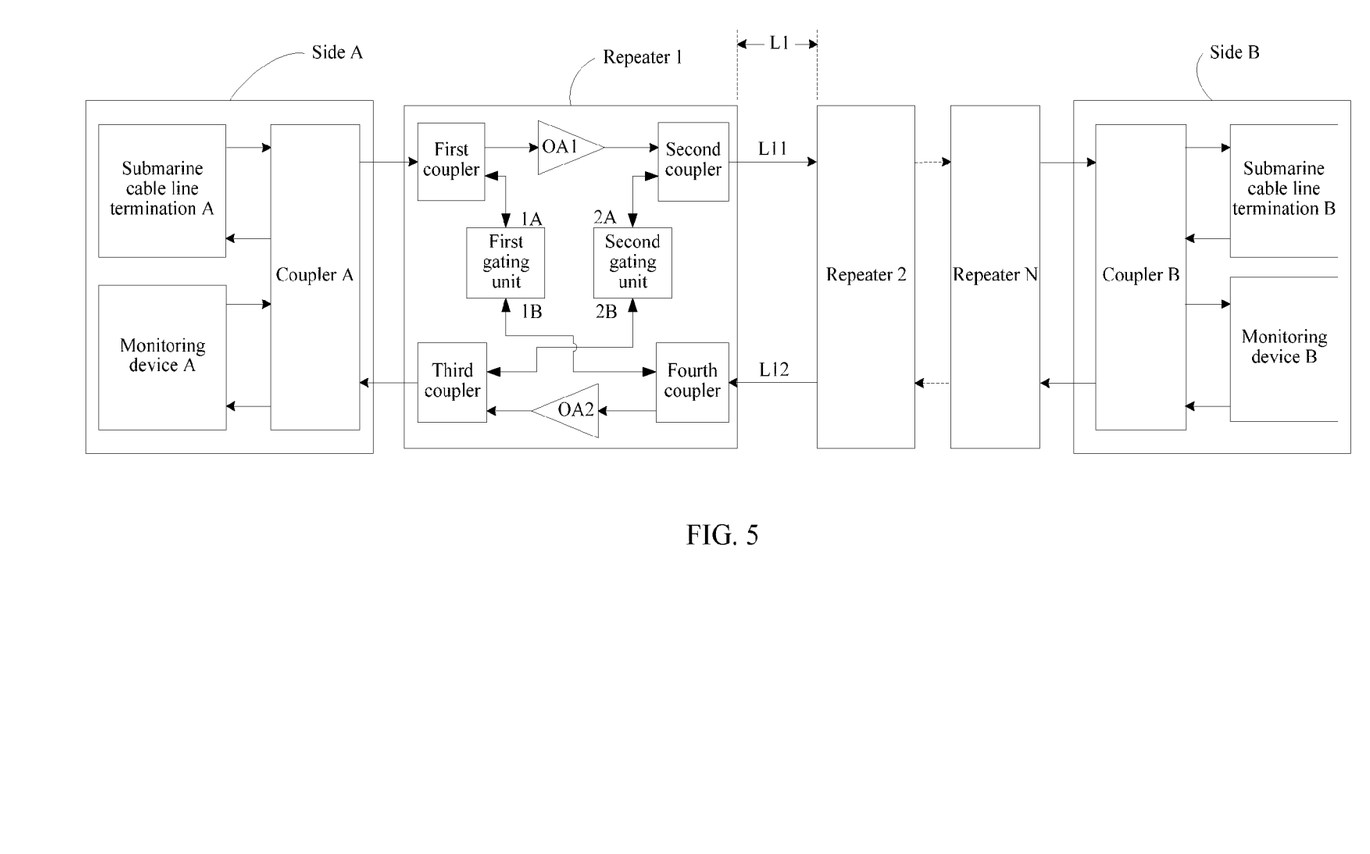
FIG. 5 is a schematic structural diagram of a submarine cable system according to an embodiment of the present invention.

Another embodiment of the present invention provides a submarine cable system, and a structure of the submarine cable system is as shown in FIG. 5, in which the submarine cable system includes at least one repeater (such as repeater 1) of a structure shown in FIG. 4. The submarine cable system also includes submarine cable line termination A, monitoring device A, and coupler A, which are located on end A; and submarine cable line termination B, monitoring device B, and coupler B, which are located on end B. Multiplexer-demultiplexers may replace the coupler A and the coupler B in the submarine cable system in this embodiment.

The following describes how to monitor the state of the uplink fiber and the state of the downlink fiber on a single end of the submarine cable system shown in FIG. 5. The monitoring on end A is still taken as an example. It is understandable that monitoring on end B is similar to the monitoring on end A.

The monitoring device A on end A sends a first probe light, and monitors the state of the downlink fiber according to the received first probe light that is transmitted back from the downlink fiber. The monitoring device A further sends a second probe light, and monitors the state of the uplink fiber in the submarine cable according to the received second probe light that is transmitted back from the downlink fiber. For the processing of the first probe light or the second probe light at the repeater, reference may be made to the description in the preceding embodiment.

The following example describes how to monitor the state of the downlink fiber according to the received first probe light that is transmitted back from the downlink fiber.

Figure 6:
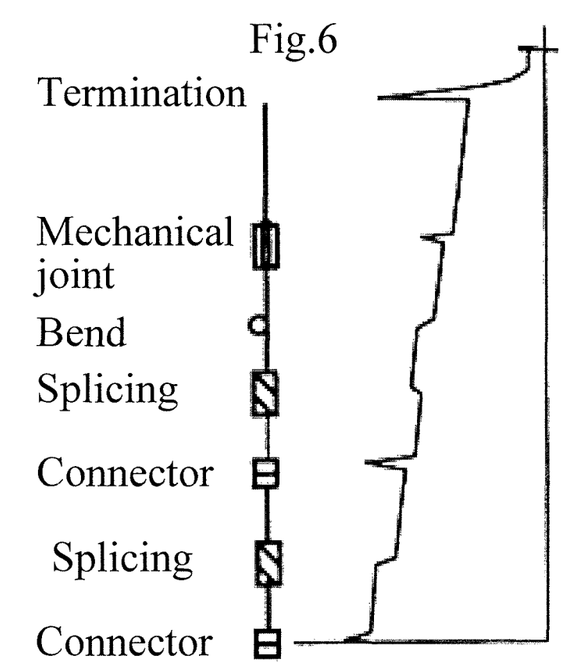
FIG. 6 shows a curve of scattered and/or reflected optical signal power that changes with a distance according to an embodiment of the present invention.

For the time difference "t" between the receiving of the first probe light and the sending of the first probe light, the monitoring device A converts "t" into distance information through a formula: $z=ct/2n$, where n is a refractive index of the fiber, c is the speed of light in vacuum and is $3\times10^8$ m/s and z is a distance which indicates that the first probe light is scattered and/or reflected at z away from end A. The monitoring device A also samples the first probe light returned along the downlink fiber to obtain power information of this first probe light. Finally, according to distance information z and power of the first probe light that is returned from the downlink fiber, the monitoring device obtains a curve of power of the first probe light returned by the downlink fiber to the monitoring device A, where the power changes with a fiber distance. FIG. 6 shows the curve.

A fiber that extends dozens of kilometers is generally spliced from multiple shorter fibers through connectors, splice joints, and mechanical joints. The connectors, splice joints, and mechanical joints are called discontinuous points. The curve in FIG. 6 shows that the power of the first probe light returned from the discontinuous points changes transiently relative to the first probe light returned from the fiber before and after the discontinuous points. That is because the first probe light undergoes Rayleigh scattering in the fiber between the discontinuous points, and undergoes Fresnel reflection at the discontinuous points. In the Rayleigh scattering, scattering strength is very small, only a very small part of the first probe light is scattered back to the monitoring device A on end A. In the Fresnel reflection, reflection strength is very small but much greater than the strength of the Rayleigh scattering. Therefore, the power of the first probe light returned from the discontinuous point changes transiently. By detecting transient points of the power, the monitoring device may determine locations of the discontinuous points in each span of the fiber accurately. Especially, when a span of a fiber is cut (a fiber cut is a type of terminations shown in FIG. 6), the fiber cut may be located accurately by the foregoing method, and the purpose of monitoring a fiber state is fulfilled.

The method for monitoring the state of the uplink fiber according to the second probe light transmitted back from the downlink fiber is almost the same as the method for monitoring the state of the downlink fiber according to the first probe light transmitted back from the downlink fiber, and is not repeated here any further.

The method for monitoring the state of the downlink fiber or the state of the uplink fiber according to the first probe light or the second probe light transmitted back from the downlink fiber is applicable to other embodiments of the present invention.

In this embodiment, the monitoring device A on end A and the monitoring device B on end B may be an Optical Time Domain Reflector (OTDR).

In this embodiment, only repeater 1 applies the structure of the repeater shown in FIG. 4, and therefore, the monitoring device may monitor both the uplink fiber and the downlink fiber in the L1 span on end A of the submarine cable system, and may monitor, on end B of the submarine cable system, states of both the uplink fiber and the downlink fiber of the submarine cable between end A and the repeater. In other embodiments, more or all repeaters in the submarine cable system apply the repeater of the structure shown in FIG. 4, and the monitoring device may monitor, on either end of the submarine cable system, both the uplink fiber and the downlink fiber in more or all spans of the submarine cable. Moreover, the submarine cable system in this embodiment reduces a requirement on a dynamic range of the monitoring device (the dynamic range decides the maximum length of a single span of the fiber that may be detected by a detection device). For example, the L1 span of the submarine cable in FIG. 5 is 120 km, and the loss of a fiber in the submarine cable is 0.2 dB/km. That is, the monitoring device in a landing station requires a dynamic range of at least 24 dB if the repeaters shown in FIG. 2 are applied. In the submarine cable system shown in FIG. 5, the monitoring device A and the monitoring device B require a dynamic range of only 12 dB, and the monitoring device A monitors the state of the 60 km fiber on the left end of the L1 span of the submarine cable, and the monitoring device B monitors the state of the 60 km fiber on the right end of the L1 span of the submarine cable. The monitoring device A and the monitoring device B each report a monitoring result to a network management system. The network management system combines the monitoring result of the monitoring device A with the monitoring result of the monitoring device B to obtain the state of the entire length of the fiber in the L1 span of the submarine cable. In the prior art, however, the monitoring device is unable to monitor the state of the entire length of the fiber in the L1 span of the submarine cable on the condition that the dynamic range of the monitoring device is reduced. Because the requirement on the dynamic range of the monitoring device is lowered, the system cost is reduced.

It should be noted that in this application, both the uplink fiber and the downlink fiber are defined by using end A of the submarine cable system as a reference point in order to unify the expression. It is understandable that, in practice, end B of the submarine cable system may be used as a reference point. In this case, an originally defined uplink fiber changes to be the downlink fiber, and an originally defined downlink fiber changes to be the uplink fiber.

Persons skilled in the art may understand that all or part of the steps of the method in the embodiments of the present invention may be implemented by a program instructing relevant hardware. The program may be stored in computer readable storage media.

The storage media may be a magnetic disk, CD-ROM, Read-Only Memory (ROM), or Random Access Memory (RAM).

The above makes a detailed introduction of a method for monitoring a state of a fiber line, a repeater, and a submarine cable system. Although the invention is described through some exemplary embodiments, the invention is not limited to such embodiments. It is apparent that those skilled in the art may make modifications and variations to the invention without departing from the spirit and protection scope of the invention. The invention is intended to cover the modifications and variations provided that they fall in the protection scope of protection defined by the following claims or their equivalents.

What is claimed is:

1. A repeater, comprising: a first optical amplifier, a second optical amplifier, a first gating unit, a second gating unit, a first coupler, a second coupler, a third coupler, and a fourth coupler, wherein:
    the first optical amplifier is configured to amplify optical signals transmitted by an uplink fiber;
    the second optical amplifier is configured to amplify optical signals transmitted by a downlink fiber;
    the first coupler is connected with the fourth coupler through the first gating unit, the second coupler is connected with the third coupler through the second gating unit;
    the first gating unit is configured to gate a first probe light, wherein a first end of the first gating unit is connected with a first output end of the first coupler, an input end of the first optical amplifier is connected with a second output end of the first coupler, an input end of the first coupler is connected with an uplink fiber of a previous span, a second end of the first gating unit is connected with a first output end of the fourth coupler, an input end of the second optical amplifier is connected with a second output end of the fourth coupler, and an input end of the fourth coupler is connected with a downlink fiber of a next span; and
    the second gating unit is configured to gate a second probe light, wherein a first end of the second gating unit is connected with a first input end of the second coupler, an output end of the first optical amplifier is connected with a second input end of the second coupler, an output end of the second coupler is connected with an uplink fiber of the next span, a second end of the second gating unit is connected with a first input end of the third coupler, an output end of the second optical amplifier is connected with a second input end of the third coupler, and an output end of the third coupler is connected with a downlink fiber of the previous span.

2. The repeater according to claim 1, wherein:
the first gating unit is a band-stop filter, and the second gating unit is a band-pass filter.

3. The repeater according to claim 1, wherein:
the first gating unit is a band-pass filter, and the second gating unit is a band-pass filter.

4. The repeater according to claim 1, wherein:
the first gating unit is a band-pass filter, and the second gating unit is a band-stop filter.

5. The repeater according to claim 1, wherein:
the first gating unit is a band-stop filter, and the second gating unit is a band-stop filter.

6. A method for monitoring a state of a fiber line, comprising:
    gating, by a first gating unit in a repeater, a first probe light transmitted by an uplink fiber of a previous span and coupling, by a fourth coupler in the repeater, the first probe light to a downlink fiber of a next span; wherein:
    the repeater comprises: a first optical amplifier, a second optical amplifier, the first gating unit, a second gating unit, a first coupler, a second coupler, a third coupler, and the fourth coupler; the first optical amplifier is configured to amplify optical signals transmitted by an uplink fiber; the second optical amplifier is configured to amplify optical signals transmitted by a downlink fiber;
    the first coupler is connected with the fourth coupler through the first gating unit, the second coupler is connected with the third coupler through the second gating unit;
    the first gating unit is configured to gate a first probe light, wherein a first end of the first gating unit is connected with a first output end of the first coupler, an input end of the first optical amplifier is connected with a second output end of the first coupler, an input end of the first coupler is connected with the uplink fiber of the previous span, a second end of the first gating unit is connected with a first output end of the fourth coupler, an input end of the second optical amplifier is connected with a second output end of the fourth coupler, and an input end of the fourth coupler is connected with the downlink fiber of the next span; and
    the second gating unit is configured to gate a second probe light, wherein a first end of the second gating unit is connected with a first input end of the second coupler, an output end of the first optical amplifier is connected with a second input end of the second coupler, an output end of the second coupler is connected with an uplink fiber of the next span, a second end of the second gating unit is connected with a first input end of the third coupler, an output end of the second optical amplifier is connected with a second input end of the third coupler, and an output end of the third coupler is connected with a downlink fiber of the previous span;
    amplifying, by the second amplifier, the first probe light scattered and/or reflected in a downlink fiber of the next span, and coupling, by the third the amplified first probe light to the downlink fiber of the previous span so that a monitoring device monitors a state of the downlink fiber of the next span according to the scattered and/or reflected first probe light that is returned along the downlink fiber; and
    amplifying, by the first amplifier, a second probe light transmitted by the uplink fiber of the previous span, and coupling, by the second coupler, the amplified second probe light to an uplink fiber of the next span; gating, by the second gating unit, and coupling, by the third coupler, the second probe light scattered and/or reflected in the uplink fiber of the next span to the downlink fiber of the previous span so that the monitoring device monitors a state of the uplink fiber of the next span according to the scattered and/or reflected second probe light that is returned along the downlink fiber.

7. The method according to claim 4, wherein:
Wavelength of the first probe light is different from that of the second probe light.

8. A submarine cable system, comprising a monitoring device and at least one repeater, wherein:
the repeater is configured to: gate a first probe light sent by the monitoring device and transmitted by an uplink fiber of a previous span of a submarine cable, and couple this first probe light to a downlink fiber of a next span of the submarine cable; and amplify the first probe light scattered and/or reflected in the downlink fiber of the next span, and couple the amplified first probe light to a downlink fiber of the previous span of the submarine cable; and the monitoring device is configured to monitor a state of the downlink fiber according to the first probe light returned along the downlink fiber; and
the repeater is further configured to: amplify a second probe light sent by the monitoring device and transmitted by the uplink fiber of the previous span of the submarine cable, and couple the amplified second probe light to an uplink fiber of the next span of the submarine cable; and further configured to gate the second probe light scattered and/or reflected in the uplink fiber of the next span of the submarine cable, and couple the gated second probe light to the downlink fiber of the previous span of the submarine cable; and the monitoring device is further configured to monitor a state of the uplink fiber according to the second probe light returned along the downlink fiber; wherein:
the repeater comprises a first optical amplifier, a second optical amplifier, a first gating unit, a second gating unit, a first coupler, a second coupler, a third coupler, and a fourth coupler, wherein:

the first optical amplifier is configured to amplify optical signals transmitted by an uplink fiber;
the second optical amplifier is configured to amplify optical signals transmitted by a downlink fiber;
the first coupler is connected with the fourth coupler through the first gating unit, the second coupler is connected with the third coupler through the second gating unit;
the first gating unit is configured to gate a first probe light, wherein a first end of the first gating unit is connected with a first output end of the first coupler, an input end of the first optical amplifier is connected with a second output end of the first coupler, an input end of the first coupler is connected with the uplink fiber of the previous span, a second end of the first gating unit is connected with a first output end of the fourth coupler, an input end of the second optical amplifier is connected with a second output end of the fourth coupler, and an input end of the fourth coupler is connected with the downlink fiber of the next span; and
the second gating unit is configured to gate a second probe light, wherein a first end of the second gating unit is connected with a first input end of the second coupler, an output end of the first optical amplifier is connected with a second input end of the second coupler, an output end of the second coupler is connected with the uplink fiber of the next span, a second end of the second gating unit is connected with a first input end of the third coupler, an output end of the second optical amplifier is connected with a second input end of the third coupler, and an output end of the third coupler is connected with the downlink fiber of the previous span.

9. The system according to claim 6, wherein the monitoring device is an Optical Time Domain Reflector.

* * * * *